United States Patent
Minnebo

(10) Patent No.: US 10,164,395 B2
(45) Date of Patent: Dec. 25, 2018

(54) ELECTRICAL DISCONNECTION TOOLS FOR DISCONNECTING A BATTERY

(71) Applicant: John Minnebo, Glen Mills, PA (US)

(72) Inventor: John Minnebo, Glen Mills, PA (US)

( * ) Notice: Subject to any disclaimer, the term of this patent is extended or adjusted under 35 U.S.C. 154(b) by 359 days.

(21) Appl. No.: 14/873,840

(22) Filed: Oct. 2, 2015

(65) Prior Publication Data
US 2016/0056441 A1 Feb. 25, 2016

Related U.S. Application Data

(60) Provisional application No. 62/131,334, filed on Mar. 11, 2015.

(51) Int. Cl.
| | | |
|---|---|---|
| H01R 43/26 | (2006.01) | |
| H01R 43/22 | (2006.01) | |
| B25B 27/00 | (2006.01) | |
| B60B 29/00 | (2006.01) | |
| H01R 13/20 | (2006.01) | |

(52) U.S. Cl.
CPC ............ *H01R 43/26* (2013.01); *B25B 27/005* (2013.01); *H01R 43/22* (2013.01); *B60B 29/003* (2013.01); *H01R 13/20* (2013.01); *Y10T 29/53222* (2015.01); *Y10T 29/53278* (2015.01); *Y10T 29/53283* (2015.01); *Y10T 29/53909* (2015.01); *Y10T 29/53943* (2015.01)

(58) Field of Classification Search
CPC ........ H01R 43/22; H01R 43/26; H01R 13/20; B25B 27/005; B60B 29/003; Y10T 29/53222; Y10T 29/53278; Y10T 29/53283; Y10T 29/53909; Y10T 29/53943
See application file for complete search history.

(56) References Cited

U.S. PATENT DOCUMENTS

| | | | | |
|---|---|---|---|---|
| 1,521,786 A | * | 1/1925 | Moss | B25B 27/005 29/246 |
| 5,499,436 A | * | 3/1996 | Merle | Y10T 29/53909 242/332.8 |
| 5,617,628 A | * | 4/1997 | Harder | H01R 43/26 254/120 |
| 8,713,773 B2 | * | 5/2014 | Foxx | Y10T 29/53909 29/270 |

FOREIGN PATENT DOCUMENTS

| | | | | |
|---|---|---|---|---|
| JP | 2011054535 A | * | 3/2011 | |
| JP | 2011150934 A | * | 8/2011 | |

* cited by examiner

*Primary Examiner* — A. Dexter Tugbang
(74) *Attorney, Agent, or Firm* — RatnerPrestia

(57) ABSTRACT

A tool for disconnecting a battery from an electrical connector pad, the tool having a body connected to at least three prongs, including a first outer prong, a second outer prong, and a middle prong. Each prong has a proximal portion connected to a distal portion by a sloped portion. The middle prong may have a side extension, including a side extension proximal portion, a side extension sloped portion, and a side extension distal portion. The tool may be part of kit comprising at least one battery adapted to be disconnected using the tool.

17 Claims, 5 Drawing Sheets

ELECTRICAL DISCONNECTION TOOLS FOR DISCONNECTING A BATTERY

CROSS REFERENCE TO RELATED INVENTIONS

This application claims priority from U.S. Provisional Patent Application Ser. No. 62/131,334, filed Mar. 11, 2015, titled "APPARATUS FOR DISCONNECTING A BATTERY," which is incorporated herein by reference in its entirety.

FIELD OF THE INVENTION

The invention relates generally to the field of mechanical tools, and more particularly, to tools for removing an electrical connector from a battery.

BACKGROUND OF THE INVENTION

Standard 9-volt batteries have two poles, a female pole and a male pole, which are conventionally spaced apart from one another and located on the same surface. Electrical connector pads are used for connecting devices to the standard 9-volt battery. Conventional electrical connector pads have two connectors that are sized and spaced to mate with the poles of the battery. However, removal of conventional electrical connectors is often difficult and potentially harmful, e.g., users may contact both the male pole and female pole, thereby receiving an unwanted electrical discharge. Therefore, there is a long standing need for easier and safer methods for removing electrical connectors from a battery.

SUMMARY OF THE INVENTION

Aspects of the invention are directed to tools for disconnecting a battery from an electrical connector pad. In accordance with one aspect of the present invention a tool for disconnecting a battery from an electrical connector includes a body connected to at least a first prong, the prong having a main region and a side extension region extending from a side of the prong. The main region comprising a main proximal portion connected to a main distal portion by a main sloped portion. The side extension region comprising a side extension proximal portion, a side extension sloped portion, and a side extension distal portion. Wherein the main distal portion has a thickness less than a thickness of the main proximal portion, the side extension distal portion has a thickness less than a thickness of the side extension proximal portion, the side extension distal portion has a thickness less than the main distal portion, and the side extension proximal portion has a thickness less than the main proximal portion.

According to another aspect of the invention, the tool for disconnecting the battery from the electrical connector may be configured to have a body connected to at least three prongs, including a first outer prong, a second outer prong, and a middle prong, each prong having a proximal portion connected to a distal portion by a sloped portion.

In accordance with yet a further aspect of the invention, the tool is adapted to disconnect a battery from an electrical connector pad, in which the battery comprises a top and a male pole and a female pole extending from the top and spaced apart from one another by a distance, and the connector pad comprises at least a male connector for mating with the battery female pole and a female connector for mating with the battery male pole. The tool includes a body connected to three prongs, including a first outer prong, a second outer prong, and a middle prong, each prong having a proximal portion connected to a distal portion by a sloped portion. The middle prong having a width that is approximately equal to the distance between the male pole and the female pole of the battery. The middle prong having a side extension extending from the middle prong toward the second prong, including a side extension proximal portion, a side extension sloped portion, and a side extension distal portion. The distal portion of the first prong and the distal portion of the middle prong have a first thickness, the proximal portion of the first prong and the proximal portion of the middle prong have a second thickness, the distal portion of the second prong and the side extension distal portion of the middle prong have a third thickness, and the proximal portion of the second prong and the side extension proximal portion of the middle prong have a fourth thickness. The first thickness being greater than the third thickness and the second thickness is greater than the fourth thickness. The tool further including a difference in thickness between the first thickness and the second thickness is approximately equal to a difference in thickness between the third thickness and fourth thickness.

In accordance with another aspect of the invention, the tool for disconnecting a battery from an electrical connector further has packaging associating the tool with at least one battery adapted to be disconnected using the tool.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The exemplary embodiments of the tool disclosed herein are configured to facilitate the removal of electrical connectors from a battery. The exemplary electrical disconnection tools may be formed of any materials not likely to permit unwanted electrical discharges to the user or to create a short circuit between the battery poles. Suitable materials for the electrical disconnection tools are preferably any materials that are not electrically conductive, including but not limited to, polymers, resins, organic fibrous materials, wood, plastics, or combinations thereof. Additionally or alternatively, all or part of the electrical disconnection tools may comprise various metals or metal alloys that are electrically insulated from the battery poles when the tool is in use, such as with a non-conductive coating, for example.

The overall shape of the electrical disconnection tools is such that it can easily be produced by injection molding; however, the apparatus is not limited to any particular mode of manufacture. Suitable methods for producing the electrical disconnection tools will be readily known by one of skill in the art, including but not limited to 3-D printing, metal stamping, casting, compression molding, carving, and the like.

Figure 7A:
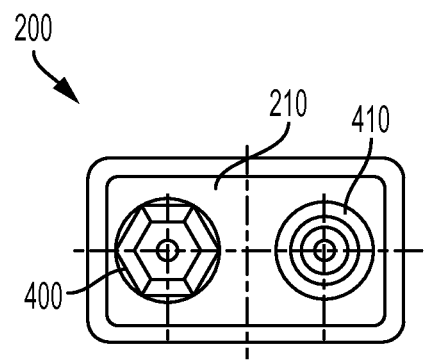
FIG. 7*a* is a top view depicting a standard 9-volt battery known in the prior art.
Figure 7B:
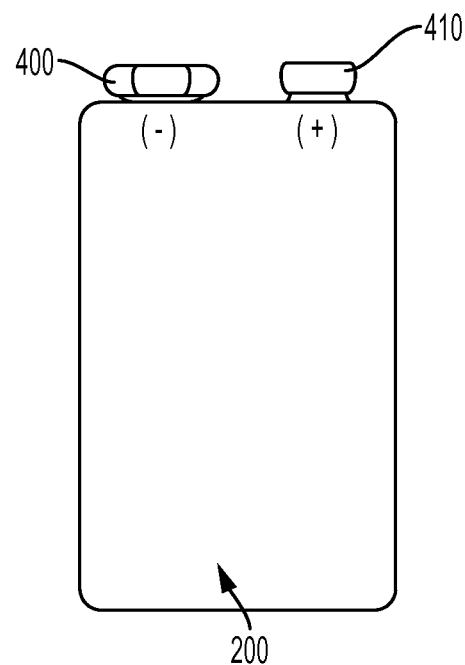
FIG. 7*b* is a front view depicting a standard 9-volt battery known in the prior art.

While exemplary embodiments of the invention are described herein with respect to methods and configurations useful for disconnecting an electrical connector pad from a 9-volt battery—such as battery 200, which is shown in more detail in FIGS. 7a and 7b, and having female pole 400 and male pole 410 as is well known in the art—the invention is not limited to any particular type or method of use, nor to a configuration adapted for use in connection with any particular voltage of battery or standard battery size. The electrical disconnection tool may be useful for separating any type of object having one or more electrical or non-electrical poles from a connector pad comprising one or more mating male or female receptacles.

Figure 1:
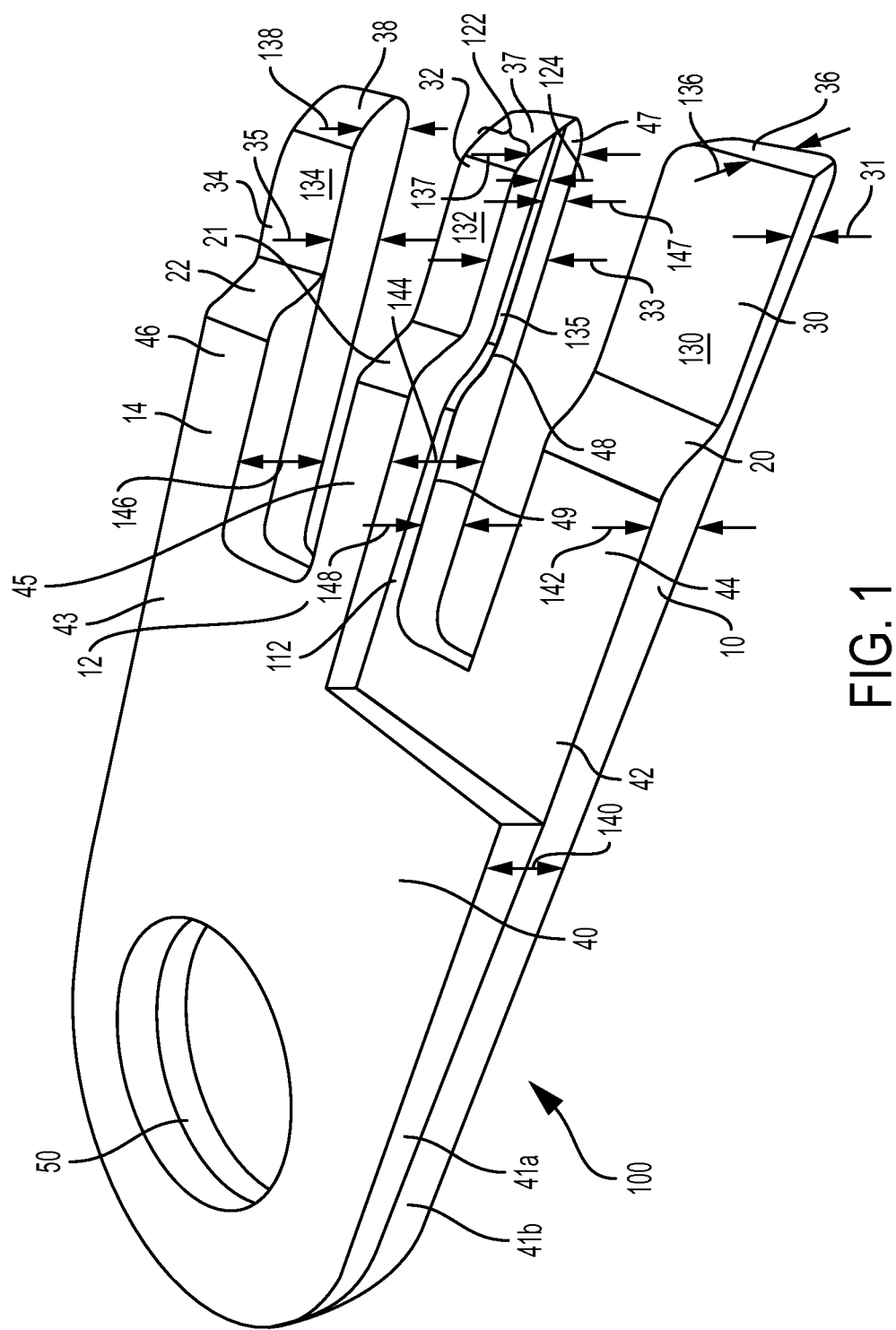
FIG. 1 is a perspective view depicting an embodiment of an electrical disconnection tool according to aspects of the invention.

Electrical disconnection tool 100 includes a body 40 and one or more prongs 10, 12, and/or 14 affixed to or integrally formed with body 40. Although depicted herein as an embodiment where body 40 and prongs 10, 12, and/or 14 are portions of a single integral piece, the one or more prongs 10, 12, and/or 14 may be discrete members attached to body 40, or any one or more discrete portions of electrical disconnection tool 100 may be connected to any other one or more discrete portions of electrical disconnection tool 100 such as by welding, interlocking features, adhesives or the like. In other embodiments, body 40 may be formed of one or more layers 41a and/or 41b that have been immovably affixed to one another. For example, although depicted as a single integral piece in FIG. 2, an exemplary layered embodiment may comprise a first layer corresponding to upper section 41a of body 40, defining a portion of the one or more prongs 10, 12, and/or 14, such as proximal portion 44, 45, and/or 46, and a second layer corresponding to lower section 41b of body 40, which may define one or more prongs 10, 12, and/or 14 in their entirety, as depicted in FIG. 1. As used herein, the term "proximal" refers to the direction closer to the body of the tool (and the hand of a user holding the tool in normal use), and the term "distal" refers to the direction away from the body of the tool in the direction which the prongs extend from the body.

The shape and size of body 40 is configured for facilitating the use of electrical disconnection tool 100. For example, body 40 may have a size and/or shape that facilitates the user's control and/or handling of electrical disconnection tool 100. Body 40 may be adapted to be gripped by the user's hand or may be gripped by one or more of the user's fingers. Although electrical disconnection tool 100 shown herein in plain view has rectangular prongs 10, 12, and 14 and the connecting body 40 has the shape of a half-stadium or arch, comprising a rectangular component joined to a semicircular component in which the diameter of the semicircle is equal to the leg of the rectangle it adjoins, body 40 is not limited to any particular geometry. In general, body 40 may have any shape that permits a user to grip electrical disconnection tool 100. As shown, body 40 has a circular hole 50 therethrough aligned with the semicircular end of body 40. Hole 50 is not limited to a circular geometry, and may be any other suitable shape. Rather than a hole, an indent may be provided that does not completely penetrate body 40. Hole 50 may be sized to receive one or more of the user's fingers. By inserting his or her finger into hole 50 of electrical disconnection tool 100, the user may have improved handle and control of electrical disconnection tool 100.

Body 40, as depicted herein, has a thickness 140 approximately equal to the thickness 142, 144, and/or 146 of one or more proximal portions 44, 45, and/or 46 of prongs 10, 12, and/or 14. Alternatively, thickness 140 of body 40 may be greater than or less than thickness 142, 144, and/or 146 of one or more proximal portions 44, 45, and/or 46 of prongs 10, 12, and/or 14.

Various embodiments of electrical disconnection tool 100 may have one prong, two prongs, and/or three prongs. The invention is not limited to a particular number of prongs, however. For example, embodiments with more than three prongs may be useful for disconnecting a battery or other apparatus with more than two poles from a connector with more than two mating connections.

Figure 2:
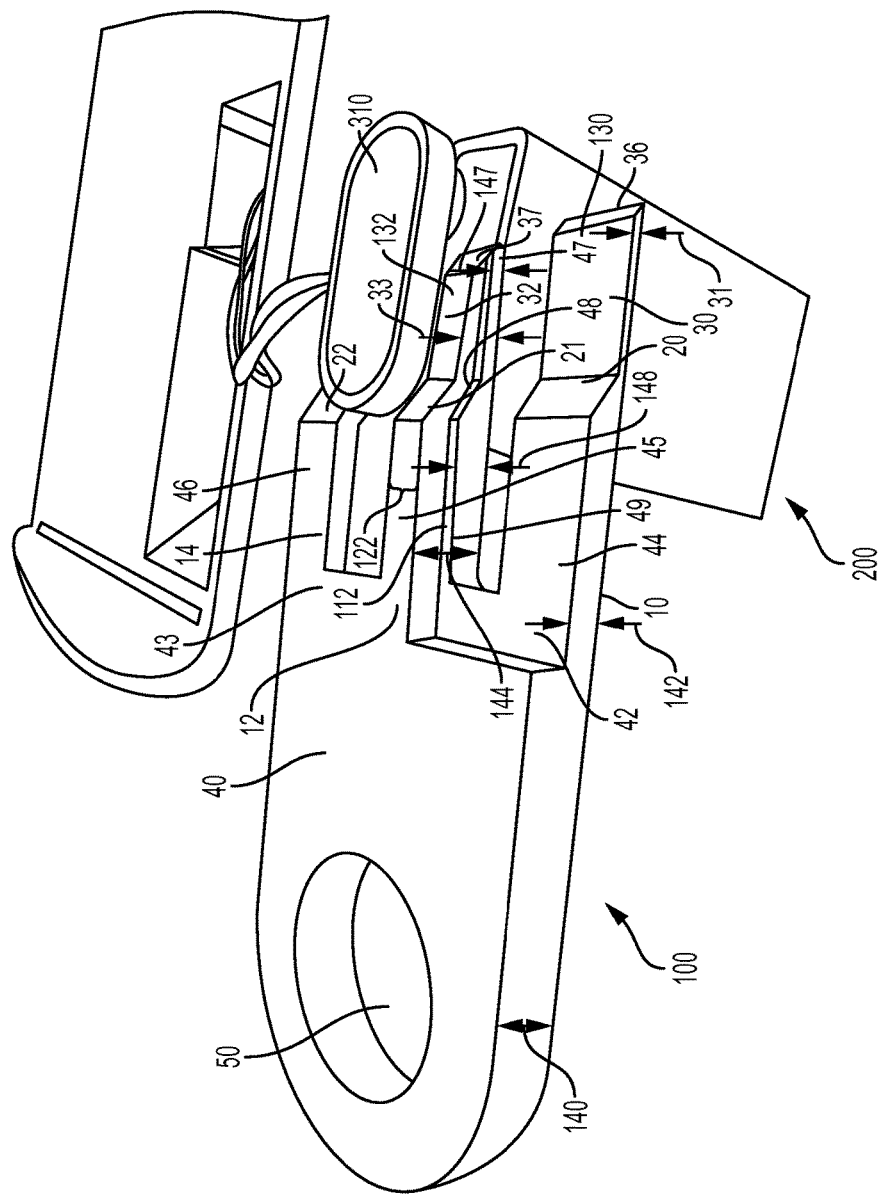
FIG. 2 is a perspective view depicting an electrical disconnection tool positioned to disconnect an electrical connector pad from a battery using two prongs in accordance with aspects of the invention.
Figure 3:
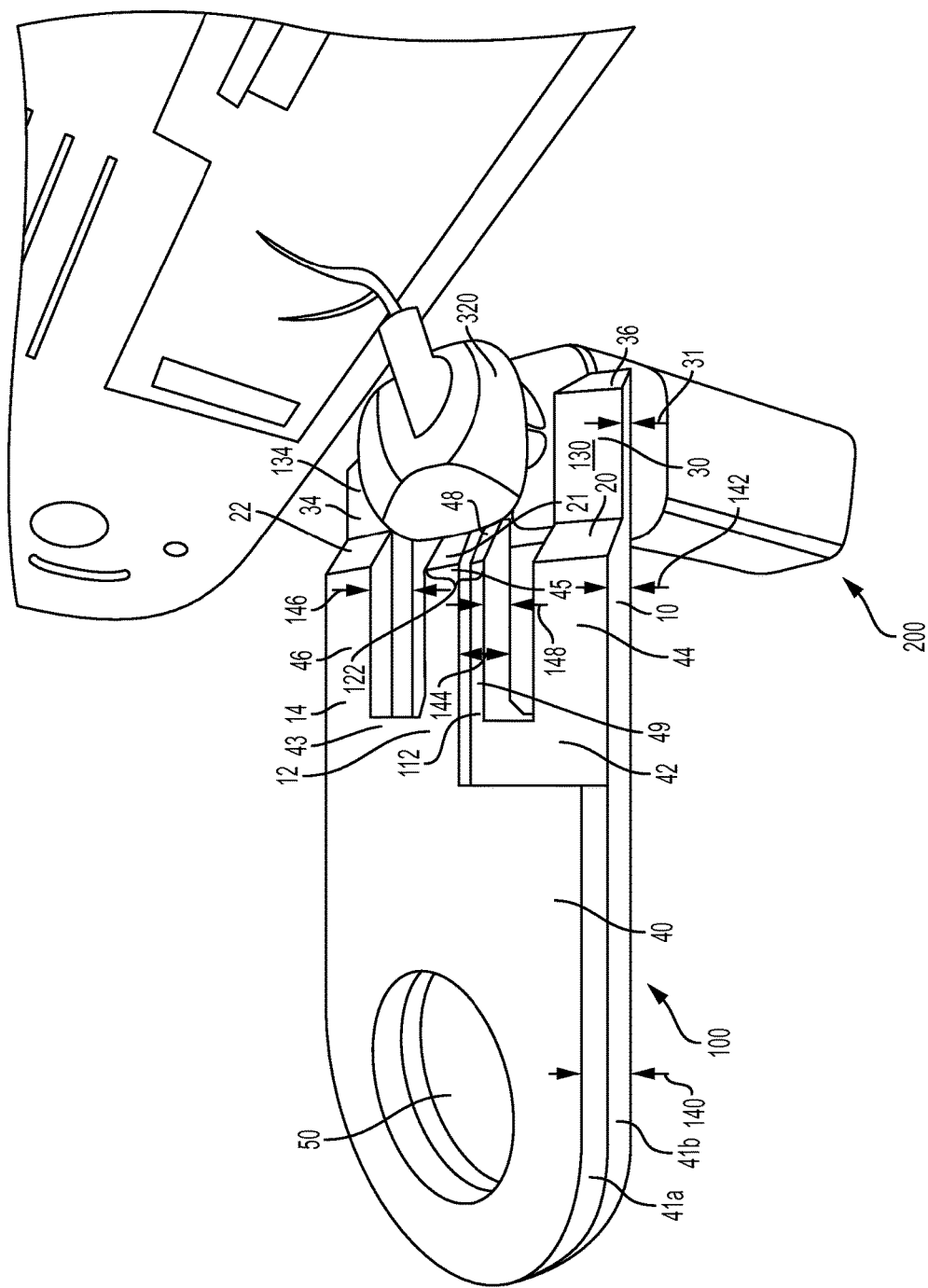
FIG. 3 is a perspective view depicting the electrical disconnection tool of FIG. 1 positioned to disconnect an electrical connector pad from a battery using three prongs.
Figure 4:
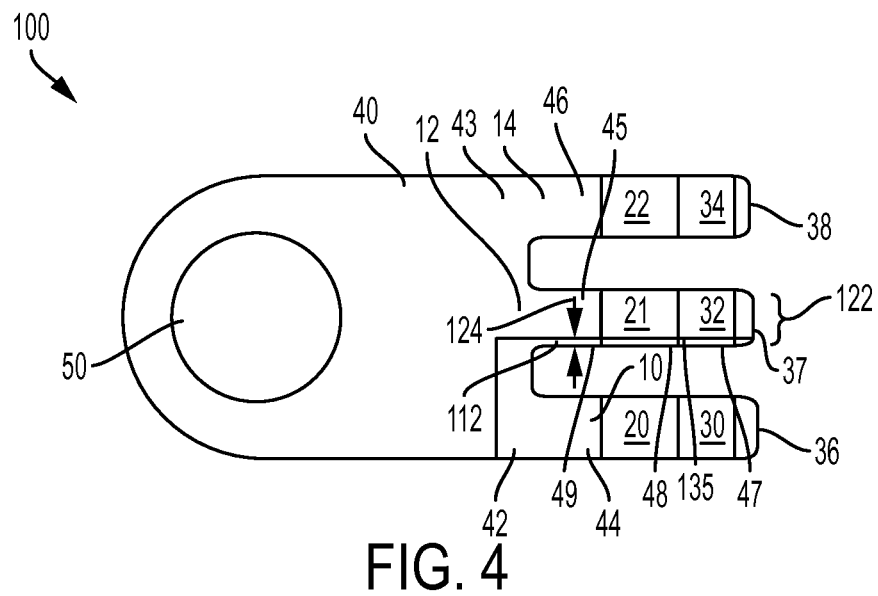
FIG. 4 is a top view depicting the electrical disconnection tool of FIG. 2.
Figure 5:
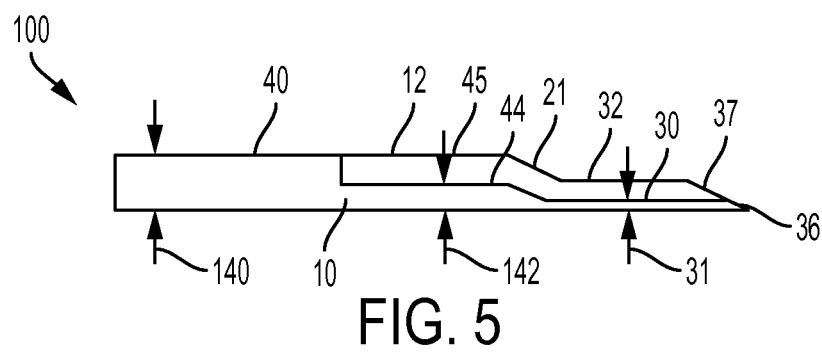
FIG. 5 is a side view depicting the electrical disconnection tool of FIG. 2.
Figure 6:
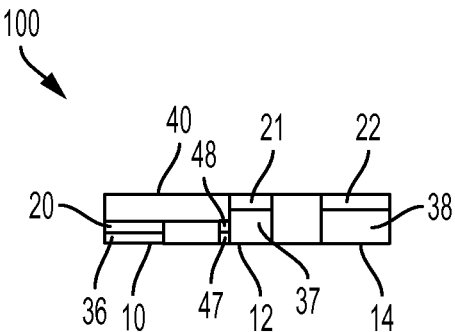
FIG. 6 is a front view depicting the electrical disconnection tool of FIG. 2.

FIGS. 1-6 depict an exemplary embodiment of electrical disconnection tool 100 having body 40 and three prongs, including left prong 14, middle prong 12, and right prong 10 extending therefrom. As used herein, directional references "left" and "right" refer to the view from the body looking outward over the prongs, but are solely used for illustration and are not intended to limit the scope of the present invention. Prongs 10, 12, and 14 may have proximal portions 44, 45, and 46 and distal portions 30, 32, and 34, respectively. In a preferred embodiment, prongs 10, 12, and/or 14 are positioned such that prongs 10 and 12 are configured to straddle female pole 400 and prongs 12 and 14 are configured to straddle a male pole of a 9 volt battery when aligned as shown in FIG. 3. Electrical disconnection tool 100 may also be configured such that prongs 12 and 14 straddle both the male pole and female pole of a 9 volt battery when aligned, as shown in FIG. 2.

Each prong 10, 12, and 14 has a respective distal portion 30, 32, and 34, sized and shaped for insertion between an electrical connector 310 or 320 and battery 200, as described above. Desirably, one or more distal portions 30, 32, and 34 may have respective thicknesses 31, 33, and 35 less than respective thicknesses 142, 144, and 146 of corresponding proximal portions 44, 45, and 46. In one embodiment, each distal portion 30, 32, and 34 has a thickness 31, 33, and 35 less than thickness 142, 144, and 146 of the corresponding proximal portions 44, 45, and 46. Each distal portion 30, 32, and 34 terminates in a free end 36, 37, and 38.

Free ends 36, 37, and 38 may be adapted to facilitate the insertion of electrical disconnection tool 100 between electrical connector 310 or 320 and battery 200. For example, free ends 36, 37, and 38 may be wedge shaped and have a thickness 136, 137, and 138 increasing from zero at the distal tip to thicknesses 31, 33, and 35 of corresponding distal portions 30, 32, and 34 of prongs 10, 12, and 14. Preferably, all of the free ends have a wedged shape in which the slopes of the wedged shape are approximately the same and/or uniform. However, fewer than all prongs may have such wedged shaped free ends, one or all may have a different slope for the wedged shape than the others, and/or the slope of the wedged shape may be uniform or non-uniform.

As shown in FIG. 1, distal portions 30, 32, and 34 are connected to corresponding proximal portions 44, 45, and 46 of respective prongs 10, 12, and 14 by sloped portions 20, 21, and 22. The sloped portions 20, 21, and 22, including a right sloped portion 48 of middle prong 12, preferably have slopes that are approximately equal to one another. Again, however, fewer than all prongs may have slopes, one or all may have a different slope than the others, and the slopes may be uniform or non-uniform. In one embodiment, sloped portions 20, 21, and 22 may define an angle with respect to respective top surfaces 130, 132, and 134 of the corresponding distal portions 30, 32, and 34 of approximately 45 degrees. The invention is not limited to any particular slope angle. An approximately equal slope, however, generates a balanced lifting action on the attached electrical connector 310 or 320 when the device is inserted (forced) between battery 200 and electrical connector 310 or 320, thereby disconnecting the male and female connectors of electrical connector pad 310 or 320 from the respective female and male poles 400 and 410 of battery 200, as first the free ends 36, 37, and 38, then the distal portions 30, 32, and 34, and then the proximal portions 44, 45, and 46 of prongs 10, 12, and 14 are sequentially pushed or wedged in between battery 200 and electrical connector 310 or 320. Although shown with the respective distal portions 30, 32, and 34 having plateaus between the wedge-shaped free ends 36, 37, and 38 and sloped portions 20, 21, and 22, the prongs 10, 12, and 14 may have a continuous slope from free ends 36, 37, and 38 to proximal portions 44, 45, and 46.

Electrical disconnection tool 100 may have a prong configuration of the left side that is different from the prong configuration of the right side. For example, as shown in FIG. 1, left side 43 (left prong 14 and middle prong 12) may be configured to disconnect a male connector of electrical connector pad 310 or 320 from female pole 400, whereas right side 42 (right prong 10 and the right extension 112 of middle prong 12, discussed in more detail below) may be configured to disconnect a female connector of electrical connector pad 310 or 320 from male pole 410. In another embodiment, the relative configurations of the left and right sides may be reversed (i.e. the left side may be configured to disconnect a female connector from male battery pole 410, and the right side may be configured to disconnect the male connector from female battery pole 400). Although the exemplary embodiments in FIGS. 1-6 depict left side 43 as being different from right side 42, electrical disconnection tool 100 is not limited to embodiments in which the left side is different from the right side.

Left prong 14 and middle prong 12 may be spaced from one another a distance suited to straddle female pole 400 of battery 200 in both of the alignments shown in FIGS. 1 and 2, which enables removal of electrical connector pad 310 or 320 from battery 200. As shown in FIG. 2, left prong 14 and middle prong 12 may straddle both male pole 410 and female pole 400 of battery 200 when fully inserted. In the exemplary embodiment illustrated in the figures, the thickness 144 of proximal portion 45 of middle prong 12 is approximately equal to the thickness 146 of proximal portion 46 of left prong 14 and thickness 33 of distal portion 32 of middle prong 12 is approximately equal to the thickness 35 of distal portion 34 of left prong 14. Desirably, thickness 33 of distal portion 32 of middle prong 12 and thickness 35 of distal portion 34 of left prong 14 are approximately equal to the distance between a top surface 210 of battery 200 and the opposing surface of electrical connector pad 310 or 320 when mated to battery 200, which is also approximately equal to the height of a female pole of a standard 9 volt battery. Distal portion 34 of left prong 14 and distal portion 32 of middle prong 12 preferably have a relatively lesser thickness 33 and 35 sloping to a relatively greater thickness 144 and 146 in their respective proximal portions 45 and 46.

Middle prong 12 may have a right extension 112, including a right proximal portion 49, a right sloped portion 48, and a right distal portion 47, extending therefrom, e.g., as a ledge from the respective proximal portion 45, sloped portion 21, and distal portion 32. As seen in FIG. 1, right sloping portion 48 connects right distal portion 47 to right proximal portion 49. Although shown in an embodiment in which width 124 of right extension 112 is less than width 122 of the remaining portion of middle prong 12, the width 124 of right extension 112 may be equal to, greater than, or less than width 122 of middle prong 12. Middle prong 12 is configured such that width 112 and/or 124 is approximately equal to or less than a distance between female pole 400 and male pole 410 of battery 200. As shown in FIG. 1, right proximal portion 49 of right extension 112 has a thickness 149 approximately equal to thickness 142 of proximal portion 44 of right prong 10, right distal portion 47 of right extension 112 has a thickness 147 approximately equal to thickness 31 of distal portion 30 of right prong 10, and right sloped portion 48 of right extension 112 has a slope approximately equal to the slope of sloped portion 20 of right prong 10.

Right prong 10 and middle prong 12 may be spaced from one another a distance suited to straddle male pole 410 of battery 200. In one method for using electrical disconnection tool 100, shown in FIG. 3, middle prong 12 is disposed between male pole 410 and female pole 400 so that right prong 10 and middle prong 12 straddle male pole 410. Thickness 31 of distal portion 30 of right prong 10 and thickness 148 of right distal portion 48 of right extension 112 of middle prong 12 are approximately equal to or slightly less than a distance between a female connector and a top 210 of battery 200 when the female connector is mated with battery 200, so that right prong 10 and right extension 112 can slide between top surface 210 of battery 200 and the female connector on electrical connector pad 310 or 320. In other words, the thickness of right distal portion 31 is approximately equal to the distance between top 210 of the body of battery 200 and the portion of the female connector closest to top 210 of the body of battery 200 when the female connector is mated with male pole 410. Distal portion 30 of right prong 10 and right distal portion 47 of right extension 112 of middle prong 12 have a relatively lesser thicknesses 31 and 147 sloping to a relatively greater thicknesses 142 and 148 in their respective proximal portions 44 and 49, such that insertion and pushing forward of electrical disconnection tool 100 acts as a wedge to force electrical connector 310 or 320 away from battery 200, when inserted.

The thickness 31 of distal portion 30 of right prong 10 and the thickness 147 of right distal portion 47 of right extension 112 of middle prong 12 may be less than thickness 35 of distal portion 34 of left prong 14 and thickness 33 of distal portion 32 of middle prong 12. Additionally or alternatively, thickness 142 of proximal portion 44 of right prong 10 and thickness 148 of right proximal portion 49 of right extension 112 of middle prong 12 may be less than thickness 146 of proximal portion 46 of left prong 14 and thickness 144 of proximal portion 45 of middle prong 12. Although the thickness of distal portions 30, 32, 34, and 47 and proximal portions 44, 45, 46, and 49 may be different, desirably, the difference in the thickness between distal portions 30, 32, 34, and 47 and proximal portions 44, 45, 46, and 49 of each prong 10, 12, and 14 are approximately equal.

Electrical disconnection tool 100 may be configured to enable a user to disconnect electrical connector pad 310 or 320 from female pole 400 and/or male pole 410 by wedging electrical disconnection tool 100 between the respective portions of battery 200 and electrical connector pad 310 or 320, as shown in FIG. 2 or FIG. 3, until sloped portions 20, 21, 22, and/or 48 provide sufficient lifting force to disconnect electrical connector 310 or 320 from battery 200. Additionally or alternatively, once one or more prongs 10, 12, and/or 14 have been wedged between battery 200 and electrical connector pad 310 or 320 a sufficient distance, as shown in FIG. 2 or FIG. 3, electrical disconnection tool 100 may be used as a lever by pushing down and/or pulling up the proximal portion relative to the distal portion and/or twisting the electrical disconnection tool 100 from left to right or right to left, after being inserted between electrical connector pad 310 or 320 and battery 200, so that top surfaces 130, 132, 134, and/or 135 contact electrical connector pad 310 or 320 to provide sufficient lifting force to disconnect the electrical connector pad 310 or 320 from battery 200. FIG. 2 illustrates a method for disconnecting electrical connector pad 310 or 320 from battery 200 by inserting electrical disconnection tool 100 toward the shorter side of battery 200 such that two prongs 14 and 12 and/or 10 and 12 are inserted between electrical connector 310 or 320 and battery 200. FIG. 3 illustrates another method for disconnecting electrical connector pad 310 or 320 from battery 200, whereby prongs 10, 12, and 14 are inserted toward the longer side of battery 200 such that each prong 10, 12, and 14 is inserted between electrical connector 310 or 320 and battery 200.

Aspects of the invention also include embodiments of an electrical disconnection tool having a body and a sole prong configured as middle prong 12 including proximal portion 45 connected to distal portion 32 by sloped portion 21. Preferably, sole prong 12 has a right extension, e.g., right extension 112, including a right proximal portion 49, a right sloped portion 48, and a right distal portion 47, extending as a ledge from the respective proximal portion 45, sloped portion 21, and distal portion 32 of sole prong 12. Sole prong 12 has a width 122 adapted for insertion between male pole 410 and female pole 400 of battery 200 to permit a user to insert sole prong 12 between electrical connector 310 or 320 and battery 200 until sloped portions 21 and right sloped portion 48 provide sufficient lifting force to disconnect the electrical connector 310 or 320 from battery 200 or until the user is able to rotate the electrical disconnection tool as a lever to disconnect electrical connector 310 or 320 from battery 200.

Further aspects of the invention include embodiments of an electrical disconnection tool having a body and two prongs, where the first prong is configured as middle prong 12. The second prong is desirably configured as right prong 10 or left prong 14. Embodiments of the electrical disconnection tool having two prongs may form left side 43 or right side 42, as described above with respect to electrical disconnection tool 100. The two prongs are configured to straddle male pole 410 or female pole 400 and enable a user employ the electrical disconnection tool as a wedge or as a lever to disconnect electrical connector 310 or 320 from battery 200, as previously described in detail.

In one useful embodiment, the tool may be sold as part of a kit in which the kit comprises the tool packaged together with one or more batteries that the tool is adapted to disconnect from standard connector pads used with those batteries. In particular, such a kit may comprise a plurality of batteries, such as a multi-pack in which the tool is packaged together with multiple batteries using packaging of any type known in the art, which may be used for sales promotions aimed at differentiating one multi-pack from competitive offerings, such as, for example, themed or timed packaging directed to events or activities that may include removal and replacement of numerous 9-volt batteries within a short period of time, such as during fire safety month when replacement of smoke detector batteries is encouraged.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A tool for disconnecting a battery from an electrical connector, comprising:
 a body connected to at least three prongs, including a first outer prong, a second outer prong, and a middle prong, each of the at least three prongs having a proximal portion connected to a distal portion by a sloped portion, the distal portion of each of the at least three prongs having a thickness less than a thickness of the respective proximal portion, the middle prong having a side extension extending from a side of the middle prong toward the second outer prong, including a side extension proximal portion, a side extension sloped portion, and a side extension distal portion, the distal portion of the first outer prong and the distal portion of the middle prong each having a first thickness, the proximal portion of the first outer prong and the proximal portion of the middle prong each having a second thickness, the distal portion of the second outer prong and the side extension distal portion of the middle prong each having a third thickness, and the proximal portion of the second outer prong and the side extension proximal portion of the middle prong each having a fourth thickness,
 wherein the first thickness is greater than the third thickness, and the second thickness is greater than the fourth thickness.

2. The tool of claim 1, wherein a difference in thickness between the first thickness and the second thickness is approximately equal to a difference in thickness between the third thickness and fourth thickness.

3. The tool of claim 1, wherein each said sloped portion has a slope, the respective slopes of each of the sloped portions between the respective distal and proximal portions of each of the prongs and the side extension are approximately equal.

4. The tool of claim 3, wherein each said sloped portion defines an angle with respect to a top surface of the respective distal portion of approximately 45 degrees.

5. The tool of claim 1, wherein the body has a hole through the body sized to receive a human finger.

6. The tool of claim 1, wherein each of the at least three prongs terminate in a free end, each said free end comprising a wedge shaped portion having a slope that distally increases from a relatively smaller thickness of zero at the free end to a relatively larger thickness distal to the free end.

7. The tool of claim 6, wherein the respective slopes of the wedged shaped portions of each of the free ends are equal to one another.

8. A tool for disconnecting a battery from an electrical connector, comprising:
a body connected to at least three prongs, including a first outer prong, a second outer prong, and a middle prong, each of the last least three prongs having a proximal portion connected to a distal portion by a sloped portion, the distal portion of each of the at least three prongs having a thickness less than a thickness of the respective proximal portion, the middle prong having a side extension extending from a side of the middle prong toward the second outer prong, including a side extension proximal portion, a side extension sloped portion, and a side extension distal portion, the distal portion of the first outer prong and the distal portion of the middle prong each having a first thickness, the proximal portion of the first outer prong and the proximal portion of the middle prong each having a second thickness, the distal portion of the second outer prong and the side extension distal portion of the middle prong each having a third thickness, and the proximal portion of the second outer prong and the side extension proximal portion of the middle prong each having a fourth thickness,
wherein the first thickness is greater than the third thickness.

9. A tool for disconnecting a battery from an electrical connector, comprising:
a body connected to at least three prongs, including a first outer prong, a second outer prong, and a middle prong, each of the at least three prongs having a proximal portion connected to a distal portion by a sloped portion, the distal portion of each of the at least three prongs having a thickness less than a thickness of the respective proximal portion, the middle prong having a side extension extending from a side of the middle prong toward the second outer prong, including a side extension proximal portion, a side extension sloped portion, and a side extension distal portion, the distal portion of the first outer prong and the distal portion of the middle prong each having a first thickness, the proximal portion of the first outer prong and the proximal portion of the middle prong each having a second thickness, the distal portion of the second outer prong and the side extension distal portion of the middle prong each having a third thickness, and the proximal portion of the second outer prong and the side extension proximal portion of the middle prong each having a fourth thickness,
wherein the second thickness is greater than the fourth thickness.

10. A kit comprising the tool of claim 1, and the battery adapted for disconnection from the electrical connector using the tool, the battery having a top and at least a female pole extending from the top, the female pole having a height from the top of the battery to a distal end of the female pole, in which the first thickness of the distal portion of the first outer prong and the distal portion of the middle prong of the tool is approximately less than or equal to the height of the female pole of the battery.

11. A kit comprising the tool of claim 1 and the battery adapted to be disconnected from the electrical connector using the tool, the battery having a top and at least a male pole extending from the top, the male pole having a height from the top of the battery to a distal end of the male pole, in which the third thickness of the distal portion of the second outer prong and the side extension distal portion of the middle prong of the tool is approximately less than or equal to a distance between the top of the battery and a height at which a female connector extends onto the male pole of the battery when mated with the male pole of the battery.

12. A kit comprising the tool of claim 1 and the battery adapted to be disconnected from the electrical connector using the tool, the battery having a top and at least one male pole and one female pole each extending from the top, in which the middle prong of the tool has a width approximately equal to a distance between the male pole and the female pole of the battery.

13. The kit of claim 12, wherein the battery is a 9 volt battery.

14. A kit comprising the tool of claim 8 and the battery adapted to be disconnected from the electrical connector using the tool, the battery having a top and at least one male pole and one female pole each extending from the top, in which the middle prong of the tool has a width approximately equal to a distance between the male pole and the female pole of the battery.

15. The kit of claim 14, wherein the battery is a 9 volt battery.

16. A kit comprising the tool of claim 9 and the battery adapted to be disconnected from the electrical connector using the tool, the battery having a top and at least one male pole and one female pole extending from the top, in which the middle prong of the tool has a width approximately equal to a distance between the male pole and the female pole of the battery.

17. The kit of claim 16, wherein the battery is a 9 volt battery.

* * * * *